United States Patent [19]

Raley et al.

[11] 4,203,715
[45] May 20, 1980

[54] ROTATING JOINT FOR EXTRUSION DIE

[75] Inventors: Garland E. Raley; C. W. Miller; D. L. Smith, all of Terre Haute, Ind.

[73] Assignee: Ethyl Corporation, Richmond, Va.

[21] Appl. No.: 889,830

[22] Filed: Mar. 24, 1978

[51] Int. Cl.² .................................. B29F 3/04
[52] U.S. Cl. .................. 425/131.1; 264/173; 425/133.1; 425/462
[58] Field of Search ............... 425/131.1, 133.1, 462; 264/173, 310, 209

[56] References Cited

U.S. PATENT DOCUMENTS

| | | | |
|---|---|---|---|
| 2,174,779 | 10/1939 | Delorme | 425/131.1 |
| 3,520,966 | 7/1970 | Soffiantini | 264/173 |
| 3,802,826 | 4/1974 | St. Eve | 425/462 |
| 3,966,861 | 6/1976 | Papesh et al. | 264/173 |

*Primary Examiner*—Jeffery R. Thurlow
*Attorney, Agent, or Firm*—Donald L. Johnson; John F. Sieberth; David L. Ray

[57] ABSTRACT

A rotating joint assembly for feeding an extrusion die with two or more thermoplastic layers of a consistent uniformity of distribution including a stationary manifold for receiving two or more thermoplastic streams and conveying the streams to discharge openings in the manifold, and a cylindrical conduit rotatably connected to the manifold, the conduit having intake openings aligned with discharge openings in the stationary base for receiving and conveying thermoplastic streams from the base to an extrusion die and an axial channel aligned with an axial channel in the stationary manifold for receiving and conveying one of the thermoplastic streams to the die.

9 Claims, 5 Drawing Figures

ROTATING JOINT FOR EXTRUSION DIE

BACKGROUND OF THE INVENTION

This invention relates to an apparatus for the simultaneous melt extrusion of a plurality of thermoplastic materials to form tubing having a multi-wall structure. More particularly, the invention is concerned with an apparatus for rotatably connecting an extrusion die for making tubing having a multi-wall structure to a series of thermoplastic melt streams exiting from a stationary base or manifold.

The term "thermoplastic material" as used herein is inclusive of all melt-extrudable thermoplastic polymers and compositions containing such polymers in admixture with fillers, pigments, dies, antioxidants, and other additives such as anti-blocking agents, anti-static agents and others ordinarily employed to modify the characteristics of the polymer.

As is known in the art, it is sometimes desirable to rotate an extrusion die in order to distribute any slight non-uniformities more evenly about the extruded tube. This is particularly important when the extruded tube is being internally inflated as it is extruded and while it is yet in the formative plastic state, to a predetermined larger diameter and then circumferentially chilling the tubing at a point to form thin film. However, when conveying a series of thermoplastic streams from a stationary manifold or extruder to a rotating die, the thermoplastic flow through the die is commonly non-uniform. Furthermore, in order to achieve more uniformity of flow, it is desirable for the thermoplastic streams to flow upward in a vertical direction to the extrusion die.

THE INVENTION

In accordance with the present invention there is provided a rotating joint assembly for feeding an extrusion die with two or more thermoplastic layers of a consistent uniformity of distribution including a stationary manifold for receiving two or more thermoplastic streams and conveying the streams to discharge openings in the manifold, and a cylindrical conduit rotatably connected to the manifold, the conduit having openings aligned with the discharge openings in the manifold for receiving and conveying thermoplastic streams from the manifold to an extrusion die and an axial channel aligned with an axial channel in the manifold for receiving and conveying one of the thermoplastic streams to the die.

DESCRIPTION OF THE PREFERRED EMBODIMENTS

Figure 1:
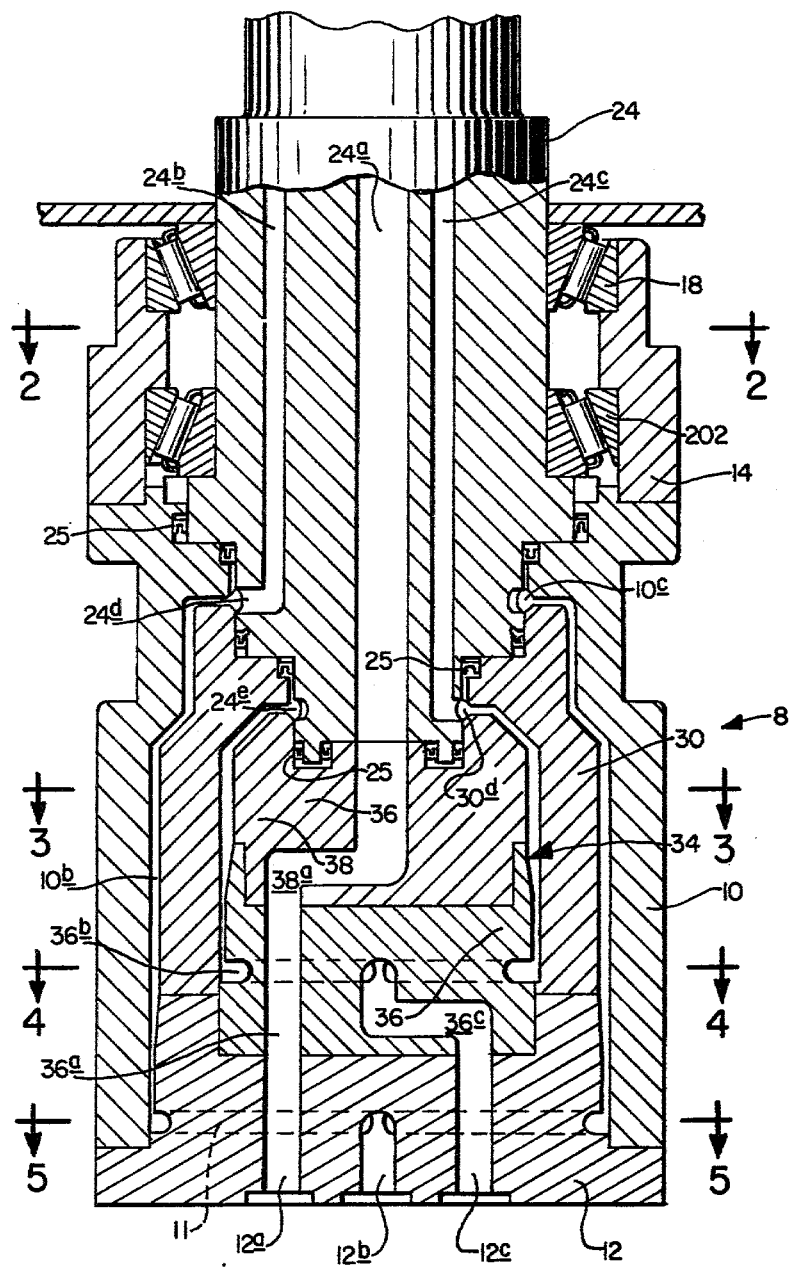
FIG. 1 is a partly cross-sectional, cutaway, elevational view of the rotating joint of the present invention.

Referring now to the drawings, there is illustrated in FIG. 1 a base or manifold generally indicated by the numeral 8. Manifold 8 includes a generally cylindrical base plate 12 to which is rigidly connected as by welding or the like, a central ring 10. Base plate 12 contains three channels, 12a, 12b, and 12c for receiving and conveying thermoplastic streams received from an extruder (not shown) or other conventional supply device.

Connected immediately above central ring 10 by welding or the like is a bearing retainer ring 14 which contains bearing assemblies 18 and 20. Bearing assemblies 18 ad 20 are conventional roller bearing assembly such as are well-known in the art.

Figure 2:
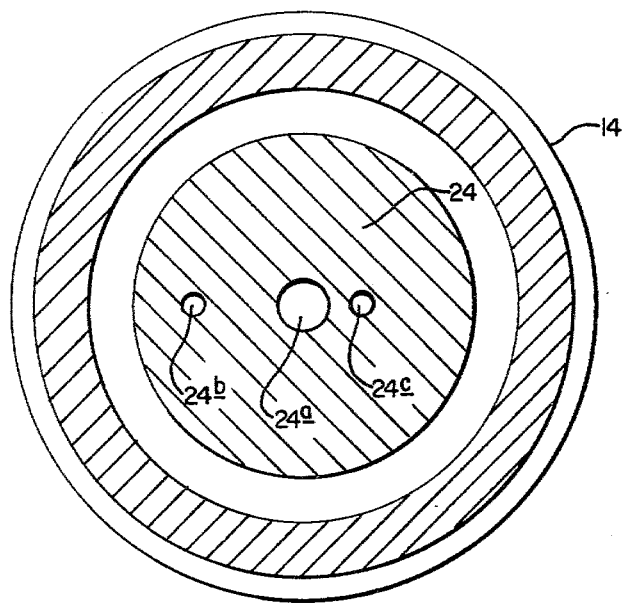
FIG. 2 is a cross-sectional view taken along lines 2—2 of FIG. 1.
Figure 3:
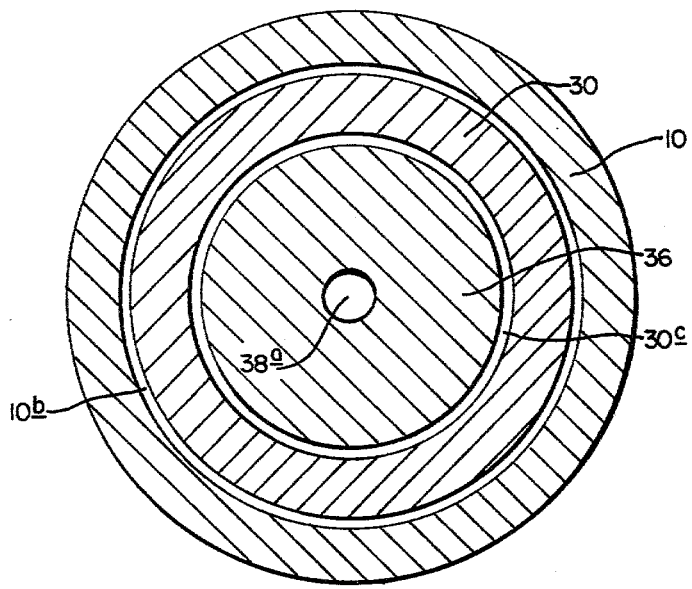
FIG. 3 is a cross-sectional view taken along lines 3—3 of FIG. 1.

Located inside bearing assemblies 18 and 20 is rotating conduit 24. Rotating conduit 24 is cylindrical in shape and has connected thereto sprocket 26 which has been partly cut away and is driven by a chain (not shown) or other similar means to rotate conduit 24. A series of vertical channels 24a, 24b, and 24c can be seen in FIGS. 1 and 2 to be contained inside conduit 24, one of said channels 24a, being axially aligned in conduit 24. Conduit 24 can be seen to rotatably slide against a series of seals 25 which prevent leakage of thermoplastic material. The seals entirely encircle the cylindrical conduit and are preferably high-pressure polymeric cup seals, although other conventional seal means could be used.

Figure 5:
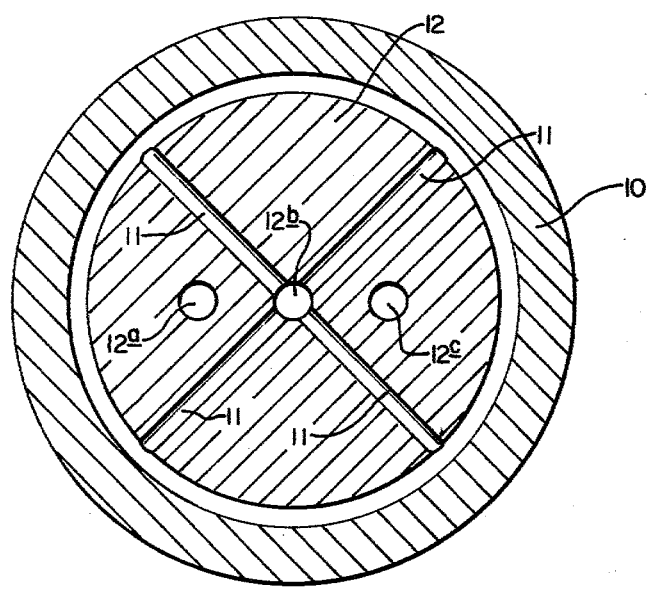
FIG. 5 is a cross-sectional view taken along lines 5—5 of FIG. 1.

Connected to base plate 12 by welding or other suitable means is intermediate ring 30. Intermediate ring 30 in combination with central ring 10 forms a cavity 10b therebetween through which a thermoplastic feed stream entering channel 12b and flowing outwardly through channel 11 shown in FIGS. 1 and 5 will enter. The thermoplastic stream entering cavity 10b will continue upwardly and exit through discharge opening 10c which is generally toroidal in shape. Discharge opening 10c is aligned with toroidal intake opening 24d in rotating conduit 24. Thus, conduit 24 is supplied with a 360 degree ring of thermoplastic melt which flows through intake opening 24d upwards through vertical channel 24b.

Figure 4:
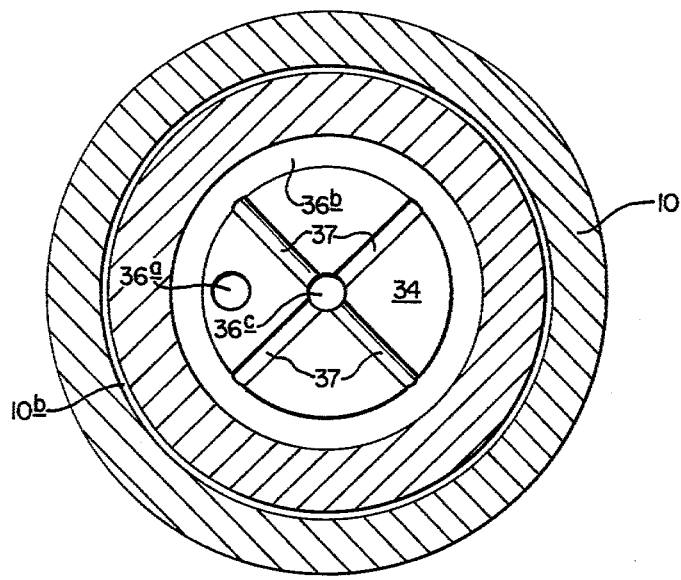
FIG. 4 is a cross-sectional view taken along lines 4—4 of FIG. 1.

As can be seen in FIG. 1, rigidly attached to base plate 12 by welding or the like is inner plug assembly generally indicated by the numeral 34. Inner plug assembly 34 includes a base ring 36 to which is attached a top ring 38 by welding or similar means. Base ring 36 has a vertical channel 36a as shown in FIGS. 1 and 4 which is aligned with channel 12a to receive and convey the thermoplastic stream introduced into channel 12a upward to channel 38a in top ring 38. Channel 38a conveys the thermoplastic stream upwardly to channel 24a.

Base ring 36 also contains channel 36c therein which is aligned with channel 12c to convey the thermoplastic stream introduced at channel 12c to horizontal channels 37 which can be seen in cross-section in FIG. 4. To aid in achieving uniform flow a toroidal opening 36b, as can best be seen in FIG. 4, is provided at the exit ends of channels 37.

Cavity 30c is formed between the exterior of assembly 34 and the interior of intermediate ring 30. Cavity 30c is similar to that of cavity 10b in shape and function. Cavity 30c receives thermoplastic melt exiting from toroidal opening 36b and conveys the stream upwards to toroidal discharge opening 30d which is similar in shape and function to toroidal discharge opening 10c. The thermoplastic stream exiting from toroidal discharge opening 30d enters toroidal intake 24e and flows into vertical channel 24c located in rotating conduit 24.

The upper portion of rotating conduit 24 may be attached to any coventional multilayer extrusion die which is adapted to receive three separate streams of thermoplastic melt. If desired, the apparatus of the present invention could be adapted to receive only two streams of thermoplastic melt or more than three streams of thermoplastic melt by deleting or adding more channels to conduit 24 and deleting or forming additional cavities by adding additional rings to the apparatus.

As is obvious, the various changes in modifications may be made in the above description without departing from the nature or spirit thereof, this invention is not restricted thereto, except as set forth in the claims.

What is claimed is:

1. A rotating joint assembly for feeding an extrusion die with two or more thermoplastic streams of a consistent uniformity of distribution comprising:
   a. a stationary vertical manifold means for receiving two or more of said thermoplastic streams and conveying said streams upwardly to a series of generally toroidal discharge means in said manifold means, said manifold means having:
      i. vertical cavity means therein for conveying said thermoplastic streams upwardly to said toroidal discharge means, the number of said cavity means being one less than the total number of thermoplastic streams fed to said extrusion die;
      ii. a plurality of horizontal channels for conveying said thermoplastic stream horizontally and outwardly to said cavity means;
      iii. vertical channel means for conveying said thermoplastic streams upward to said horizontal channels;
      iv. first axial channel means for conveying one of said thermoplastic streams upwardly to a central discharge opening in the center of said stationary manifold means; and,
   b. a cylindrical conduit means rotatably connected to said manifold means, said conduit means having:
      i. a plurality of generally toroidal intake means aligned with each of said generally toroidal discharge means for receiving and conveying said thermoplastic streams from said manifold means through vertical channel means in said cylindrical conduit means to an extrusion die;
      ii. second axial channel means aligned with said central discharge opening for receiving and conveying one of said thermoplastic streams to said die.

2. The rotating joint assembly of claim 1 wherein said cavity means comprises first and second cavity means.

3. The rotating joint assembly of claim 2 wherein said first of said cavity means is aligned with the first toroidal intake means in said conduit means for conveying said thermoplastic streams from said manifold means to said conduit means.

4. The rotating joint assembly of claim 3 wherein said first of said cavity means has the first toroidal discharge means for discharging said thermoplastic streams into said first toroidal intake means in said conduit means.

5. The rotating joint assembly of claim 2 wherein said second of said cavity means is aligned with the second toroidal intake means in said conduit means for conveying said streams from said manifold means to said conduit means.

6. The rotating joint assembly of claim 5 wherein said second of said cavity means has the second toroidal discharge means for discharging said thermoplastic streams into said second toroidal intake means in said conduit means.

7. The rotating joint assembly of claim 1 wherein said conduit means has sprocket means connected thereto for rotating said conduit means.

8. The rotating joint assembly of claim 7 wherein said conduit means is rotatably retained by roller bearing means.

9. The rotating joint assembly of claim 8 wherein seal means are located between said conduit means and said manifold means to prevent leakage of said thermoplastic streams from said rotating joint assembly.

* * * * *